United States Patent
Grunnet et al.

(10) Patent No.: US 10,920,749 B2
(45) Date of Patent: Feb. 16, 2021

(54) CONTROL SYSTEM FOR A WIND TURBINE

(71) Applicant: VESTAS WIND SYSTEMS A/S, Aarhus N (DK)

(72) Inventors: Jacob Deleuran Grunnet, Tranbjerg J (DK); Claus Thybo, Åbyhøj (DK); Johnny Nielsen, Svenstrup J (DK); Jes Rasmussen, Galten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 111 days.

(21) Appl. No.: 15/845,451

(22) Filed: Dec. 18, 2017

(65) Prior Publication Data
US 2018/0171980 A1 Jun. 21, 2018

(30) Foreign Application Priority Data
Dec. 21, 2016 (DK) .................................. 201671017

(51) Int. Cl.
| | | |
|---|---|---|
| *F03D 7/04* | (2006.01) | |
| *F03D 7/02* | (2006.01) | |
| *G06T 17/00* | (2006.01) | |
| *F03D 17/00* | (2016.01) | |

(52) U.S. Cl.
CPC ............... *F03D 7/045* (2013.01); *F03D 7/02* (2013.01); *F03D 7/0224* (2013.01); *F03D 17/00* (2016.05); *G06T 17/00* (2013.01); *F05B 2270/101* (2013.01); *F05B 2270/328* (2013.01); *F05B 2270/8042* (2013.01); *Y02E 10/72* (2013.01)

(58) Field of Classification Search
CPC . F03D 7/045; F03D 7/02; F03D 17/00; F03D 7/0224; G06T 17/00; Y02E 10/723; F05B 2270/8042; F05B 2270/328; F05B 2270/101
See application file for complete search history.

(56) References Cited

U.S. PATENT DOCUMENTS

| | | | |
|---|---|---|---|
| 9,035,231 B2 * | 5/2015 | Zheng | F03D 17/00 |
| | | | 250/227.11 |
| 9,128,184 B1 * | 9/2015 | Bachmann | F03D 7/0268 |
| 9,164,120 B2 * | 10/2015 | Soerensen | G01P 5/001 |
| 9,261,355 B2 * | 2/2016 | Bertolotti | F03D 1/06 |

(Continued)

FOREIGN PATENT DOCUMENTS

| | | |
|---|---|---|
| DE | 102009007938 A1 | 8/2010 |
| DE | 102009022179 A1 | 11/2010 |

(Continued)

OTHER PUBLICATIONS

Extended European Search Report for Application No. 17206584.9-1007 dated Sep. 5, 2018.

(Continued)

*Primary Examiner* — Charles R Kasenge
(74) *Attorney, Agent, or Firm* — Patterson + Sheridan, LLP

(57) ABSTRACT

The present disclosure relates to a control system for a wind turbine that is configured to: obtain a 3-dimensional image of at least a portion of a wind turbine blade; recognise a target feature of the wind turbine blade in the obtained image and identify the position of the target feature; and monitor the state of the wind turbine blade and/or control operation of at least one blade in dependence on the identified position of the feature.

20 Claims, 3 Drawing Sheets

(56) References Cited

U.S. PATENT DOCUMENTS

| | | | | |
|---|---|---|---|---|
| 9,441,610 B1* | 9/2016 | Bachmann | | F03D 7/0268 |
| 9,909,557 B2* | 3/2018 | Christiansen | | F03D 17/00 |
| 9,996,747 B2* | 6/2018 | Newman | | G01N 25/72 |
| 2007/0075546 A1* | 4/2007 | Avagliano | | F03D 7/0224 |
| | | | | 290/44 |
| 2009/0047116 A1* | 2/2009 | Barbu | | F03D 7/0224 |
| | | | | 415/1 |
| 2009/0263245 A1* | 10/2009 | Shi | | F03D 7/02 |
| | | | | 416/43 |
| 2010/0085557 A1* | 4/2010 | Antoniou | | F03D 7/0224 |
| | | | | 356/28.5 |
| 2010/0135789 A1* | 6/2010 | Zheng | | F03D 7/0224 |
| | | | | 416/1 |
| 2011/0103933 A1* | 5/2011 | Olesen | | G01B 11/16 |
| | | | | 415/118 |
| 2011/0135442 A1* | 6/2011 | Kerber | | F03D 17/00 |
| | | | | 415/1 |
| 2011/0140060 A1* | 6/2011 | Olson | | F03D 80/30 |
| | | | | 254/394 |
| 2011/0243736 A1* | 10/2011 | Bell | | F03D 1/0675 |
| | | | | 416/132 R |
| 2012/0002038 A1* | 1/2012 | Furrer | | A45D 31/00 |
| | | | | 348/129 |
| 2012/0045330 A1* | 2/2012 | Wu | | F03D 7/042 |
| | | | | 416/1 |
| 2012/0056426 A1* | 3/2012 | Van Kuik | | F03D 7/0224 |
| | | | | 290/44 |
| 2012/0128488 A1* | 5/2012 | Kristoffersen | | F03D 7/0224 |
| | | | | 416/31 |
| 2013/0002829 A1* | 1/2013 | Soerensen | | G01P 5/001 |
| | | | | 348/49 |
| 2013/0093879 A1* | 4/2013 | Bertolotti | | F03D 1/06 |
| | | | | 348/125 |
| 2013/0136594 A1* | 5/2013 | Casazza | | F03D 7/0224 |
| | | | | 416/1 |
| 2013/0267375 A1* | 10/2013 | Tadayon | | F03D 1/065 |
| | | | | 475/337 |
| 2013/0300855 A1* | 11/2013 | Fritz | | G01N 21/954 |
| | | | | 348/82 |
| 2014/0054476 A1* | 2/2014 | Zheng | | F03D 17/00 |
| | | | | 250/578.1 |
| 2017/0145986 A1* | 5/2017 | Baehmann | | F03D 1/0675 |
| 2018/0171980 A1* | 6/2018 | Grunnet | | F03D 7/02 |
| 2018/0171985 A1* | 6/2018 | Grunnet | | G01S 17/89 |
| 2018/0246138 A1* | 8/2018 | Holtom | | G01P 5/26 |

FOREIGN PATENT DOCUMENTS

| | | |
|---|---|---|
| DE | 202015008939 U1 | 3/2016 |
| EP | 2551699 A2 | 1/2013 |
| EP | 2565449 A2 | 3/2013 |
| WO | 2010089139 A1 | 8/2010 |
| WO | 2013050485 A2 | 4/2013 |

OTHER PUBLICATIONS

Danish Patent and Trademark Office Search Report for Application No. PA 2016 71017 dated May 4, 2017.

European Patent Office, Communication pursuant to Article 94(3) EPC, Application: 17 206 584.9-1007, dated Jul. 8, 2020.

* cited by examiner

CONTROL SYSTEM FOR A WIND TURBINE

TECHNICAL FIELD

The present disclosure relates to a control system for a wind turbine, to a wind turbine, and to a method of controlling a wind turbine.

BACKGROUND

Wind turbines are generally provided with a monitoring system for determining various in use blade state parameters, such as blade deflection, blade twist, blade pitch angle, blade loading, blade vibration and rotational speed. Conventional blade monitoring systems typically include a large number of individual sensors such as strain sensors and accelerometers at various locations in each wind turbine blade. Each sensor is configured to measure a specific quantity at its specific location, and the monitoring system is configured to determine blade state parameters in dependence on data received from each of the sensors.

However, installing a large number of individual sensors in a wind turbine blade is time consuming and expensive, and it may not be possible to install sensors in all locations for which a reading may be desired. In addition, blade monitoring systems that rely on data from a large number of individual sensors may be impaired if one or more of the sensors stop functioning correctly, and sensors in certain locations may be difficult to repair or replace if damaged.

In addition, a blade monitoring system may include a camera that is focussed on a specific visible or reflective marker mounted to a wind turbine blade, and the blade monitoring system may be configured to determine blade state parameters in dependence on movement of the marker within the field of view of the camera in combination with knowledge of the exact position of the marker with respect to the wind turbine blade. However, such a system requires one or more markers to be mounted within the wind turbine blade in exact known positions, which presents challenges during manufacture and maintenance of the wind turbine blade.

Blade state parameters determined in the manner described above may be used by a wind turbine controller in controlling operation of the wind turbine, for example in setting pitch angles for the blades or setting a torque or power output demand. However, wind turbine controllers configured to operate in this manner may be complicated, and rely on data being received from a complex system of sensors as described above.

It is an aim of the present invention to address disadvantages associated with the prior art.

SUMMARY OF THE INVENTION

According to a first aspect of the present invention there is provided a control system for a wind turbine, wherein the control system is configured to:
  obtain an image of at least a portion of a wind turbine blade;
  recognise a target feature of the wind turbine blade in the obtained image and identify the position of the target feature; and
  monitor the state of the wind turbine blade and/or control operation of at least one blade in dependence on the identified position of the target feature.

The control system of the present invention provides a simple, reliable and effective way to monitor a wind turbine blade and/or control operation of one or more wind turbine blades in dependence on a detected change in the shape or orientation of a blade of the wind turbine in use. The control system may reduce or eliminate the need to include a large number of individual sensors such as strain sensors and accelerometers in the blade that are each configured to measure a specific quantity at their respective locations. However, it will be appreciated that the blade may still be provided with additional sensors that may also be used in monitoring the state of the blade.

The target feature may be any feature of the wind turbine blade that has been selected to be monitored for the purpose of monitoring the wind turbine blade and/or controlling operation of one or more wind turbine blades. The control system may be configured to recognise the target feature by extracting the target feature from the obtained image using a feature extraction or object detection algorithm, and associating the target feature in the obtained image with the target feature in a previously obtained reference image. The control system may be configured to identify the positions of a plurality of separate target features of the blade in the image, and to control operation of the at least one blade in dependence on the identified positions of the plurality of target features (although in some cases the control system may be configured to operate by identifying a single target feature only). Therefore references to the "the target feature" may equally apply to a plurality of target features.

The image may be an image of at least a portion of the interior of the wind turbine blade. The image may include a significant portion of the blade, and optionally substantially the entirety of the blade. This is in contrast to prior art camera based blade monitoring systems, in which the camera is focussed on a small pre-determined visible marker such that the images produced by the camera show only a small portion of the blade around the pre-determined marker. The image may include at least a portion of the front and/or rear skins of the blade and/or at least a portion of a box spar or one or more spars of the blade.

The image may be a 3-dimensional image or measurement, for example a 3-dimensional image or measurement obtained using a LIDAR scanning system. The control system may be configured to determine the distance between the target feature and a camera used to obtain the image and/or to determine the position of the target feature along the length of the blade. By determining the distance to the target feature and/or the position of the target feature along the length of the blade the control system may be able to use the position of the target feature in monitoring the wind turbine blade, determining at least one blade state parameter for the wind turbine blade and/or controlling operation of one or more wind turbine blades without requiring preknowledge of the exact position of the target feature with respect to the blade. Alternatively the image may be a 2-dimensional image, for example an image obtained using a standard optical camera.

The control system may be configured to control operation of the at least one blade by controlling, for example, pitch angle for the blade and/or by controlling torque or power output for the wind turbine. The control system may be configured to control operation of the at least one blade by outputting a control signal for controlling operation of the at least one blade, for example a control signal setting a pitch angle, torque or power output demand.

The control system may be configured to control operation of the at least one blade in order to limit blade twist, blade deflection, vibration, torque and/or power output. The control system may be configured to control operation of the at least one blade in order to maintain blade twist, blade deflection, vibration, torque and/or power output below a threshold.

The control system may be configured to determine at least one blade state parameter for the wind turbine blade in dependence on the identified position of the target feature. The at least one blade state parameter may comprise at least one of: blade deflection, blade twist, blade pitch angle, blade loading, strain, blade vibration, rotational speed, blade velocity, and blade acceleration. The control system may be configured to determine the one or more blade state parameters for one or more individual points on the blade, at one or more regions of the blade, and/or for the blade as a whole. The blade state parameter(s) may be used in many different monitoring and control applications, for example in power optimisation, thrust control, blade load control, pitch control, ice detection, damage detection and monitoring of aero-elastic properties.

The control system may be configured to control operation of the at least one blade in dependence on the determined blade state parameter(s). However, in other embodiments the control system may be configured to control operation of the at least one blade directly in dependence on the identified position of the target feature (for example in dependence on the error between the identified position of the target feature and a reference position for the target feature), in which case determining blade state parameters may not be necessary.

The control system may be configured to identify a behavioural condition of the wind turbine blade in dependence on the identified position of the target feature. For example, the control system may be configured to identify a condition of high blade deflection or high vibration, or a condition associated with blade damage or a build-up of ice in dependence on the identified position of the target feature. The control system may be configured to output a warning notification and/or to control operation of at least one blade in dependence on identification of a behavioural condition, for example if a threshold is exceeded.

The control system may be configured to monitor the state of the wind turbine blade and/or control operation of the at least one blade in dependence on the location and/or orientation of the target feature. The term "position" as used throughout this specification refers to both the location of the target feature (that is where the target feature appears in the image) and the orientation of the target feature (that is the angle at which the target feature appears in the image).

The control system may be configured to monitor the state of the wind turbine blade and/or control operation of the at least one blade in dependence on the position of the target feature relative to the field of view of the image and/or in dependence on the position of the target feature relative to a further target feature recognised in the image.

The control system may be configured to monitor the state of the wind turbine blade and/or control operation of the at least one blade directly in dependence on the position of the target feature. For example, the control system may be configured to determine an error between the identified position of the target feature and a reference position for the target feature (for example a reference position relative to the field of view of the image or a reference position relative to a further target feature recognised in the image), and to monitor the state of the wind turbine blade and/or control operation of the at least one blade in dependence on the error between the identified position of the target feature and the reference position for the target feature. For example, the control system may be configured to output a control signal setting a demand (such as a pitch angle, torque or power output demand) in dependence on the error between the location and/or orientation of the target feature and a reference location and/or orientation for the target feature.

The control system may be configured to determine the error between the identified position of the target feature and the reference position by comparing the obtained image with a previously obtained reference image, associating the target feature in the obtained image with the target feature in the reference image, and determining the difference in the position of the target feature between the obtained image and the reference image.

The control system may be configured to control operation of the at least one blade in proportion to the error between the identified position of the target feature and the reference position. For example, the control system may be configured to calculate a demand (such as a pitch angle, a torque or power output demand) in proportion to the error between the identified position of the target feature and the reference position. The demand may be calculated by multiplying the error with a gain factor. The gain factor may be pre-defined before installation of the control system, or alternatively set during calibration of the control system.

The reference position for the target feature may be based on the position of the target feature in a previously obtained reference image. The reference image may be, for example, an image obtained during calibration of the control system, optionally while the blade is not loaded. Alternatively the reference image may be a more recent image obtained during use of the wind turbine, for example an image obtained during a previous monitoring cycle.

Alternatively, or in addition, the control system may be configured to monitor the state of the wind turbine blade and/or control operation of the at least one blade in dependence on a derivative of the position of the target feature (that is indirectly in dependence on the position of the target feature). For example, the control system may be configured to determine a rate of change of position or an acceleration of the target feature (for example a rate of change of position or an acceleration of the target feature relative to the field of view of the image or relative to a further target feature recognised in the image), and to monitor the state of the wind turbine blade and/or control operation of the at least one blade in dependence on the determined rate of change of position or acceleration of the target feature. The control system may be configured to determine the rate of change of position or acceleration of the target feature in dependence on an error between the identified position of the target feature and a reference position for the target feature (for example a reference position relative to the field of view of the image or a reference position relative to a further target feature recognised in the image). The reference position for the target feature may be based on the position of the target feature in a previously obtained reference image, for example a recent image obtained during a previous monitoring cycle.

The control system may be configured to identify the position of a natural feature of the blade and/or to identify the position of a marker attached to the blade. Natural features are inherent features of the blade that have not been added for the specific purpose of being identified. Natural features may include, for example, edges or corners of structural components of the blade, lightning rods, and imperfections such as visible adhesive spots. Markers are devices such as reflective patches or strips of reflective tape that are added to the blade specifically for the purpose of being identified in an image. The control system may be configured to identify the positions of a plurality of target features including both natural features and markers.

The control system may be configured to automatically select the target feature from a plurality of recognisable features. The selection of the target feature may be performed during an initial calibration process for the control system, for example by selecting the target feature from a plurality of recognisable features extracted from an initial reference image. The control system may therefore be capable of independently selecting a suitable target feature to monitor the position of without being initially focussed on a specific target feature and without requiring any user input to select the target feature. In this way it may not be necessary to rely on any pre-selected features having known positions. This is in contrast to known camera based blade monitoring systems which focus on a pre-determined visible marker provided on a blade and require pre-knowledge of the exact position of the marker with respect to the blade (for example the position of the marker along the length of the blade) in order to determine blade deflection.

The control system may further comprise an imaging device configured to generate the image. The imaging device may be configured to generate either a 2-dimensional image of at least a portion of the wind turbine blade or a 3-dimensional image or measurement of at least a portion of the wind turbine blade. However, it will be appreciated that in some cases the imaging device may be supplied separately to the control module(s) forming the control system of the present invention.

The imaging device may comprise a transmitter configured to emit a signal and a receiver configured to receive the reflected signal. The transmitter and the receiver may be located together within a common housing, or alternatively may be provided separately, and optionally at separate locations. The transmitter may optionally be configured to emit a pulsed signal.

The imaging device may be an electromagnetic radiation based imaging device. For example, the imaging device may be a visible light based imaging device. In some embodiments the emitter may be a laser light emitter. Alternatively the imaging device may operate using electromagnetic radiation at a different frequency, for example radio waves, microwaves, infrared light, ultraviolet light, X-rays or gamma rays. Alternatively the imaging device may be a sonar imaging device.

The imaging device may comprise a 3-dimensional scanning device. Alternatively the imaging device may comprise a camera configured to generate 2-dimensional images.

The imaging device may comprise a LIDAR scanning device, that is a Light Imaging Detection and Ranging scanning device. The LIDAR scanning device may be a micro-LIDAR device (that is a small form factor LIDAR device, which may have a width and/or height of less than 100 mm or less than 60 mm) and/or a solid state LIDAR device and/or a single chip LIDAR device.

The imaging device may be mounted to the wind turbine blade. Alternatively the imaging device may be mounted to a hub from which the blade extends.

The imaging device may be located inside the wind turbine blade.

The imaging device may be located within a root portion of the wind turbine blade and face towards a tip of the wind turbine blade.

According to a further aspect of the present invention there is provided a wind turbine provided with a control system according to any preceding claim.

According to a further aspect of the present invention there is provided a method of monitoring and/or controlling a wind turbine, the method comprising: obtaining an image of at least a portion of a blade of the wind turbine; automatically recognising a target feature of the wind turbine blade in the obtained image and identifying the position of the target feature; and monitoring the state of the wind turbine blade and/or controlling operation of at least one blade of the wind turbine in dependence on the identified position of the target feature. The method may further include any steps associated with the normal operation of the control system or wind turbine described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
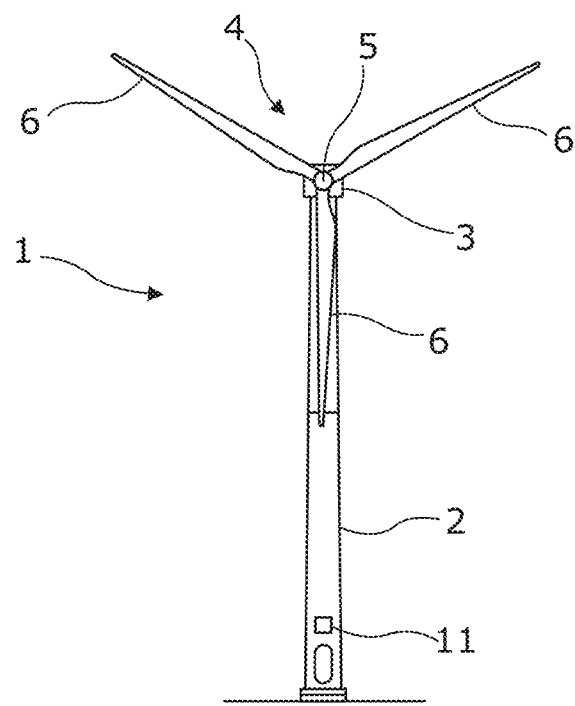
FIG. 1 schematically illustrates a wind turbine including a control system according to an embodiment of the present invention.
Figure 3:
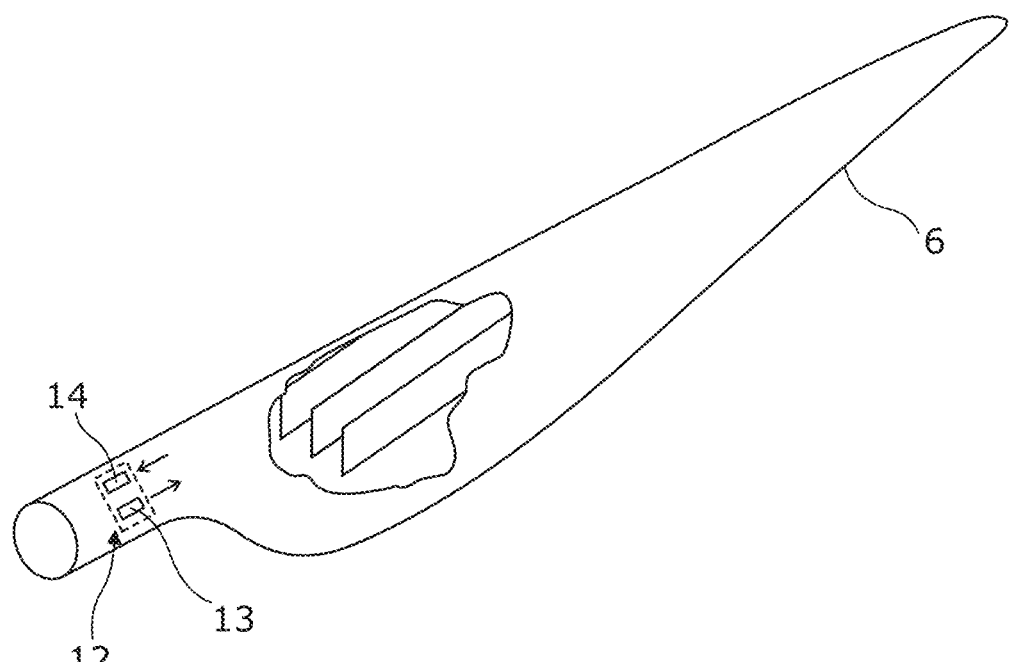
FIGS. 3 and 4 schematically illustrate a blade of the wind turbine including a LIDAR device.
Figure 4:
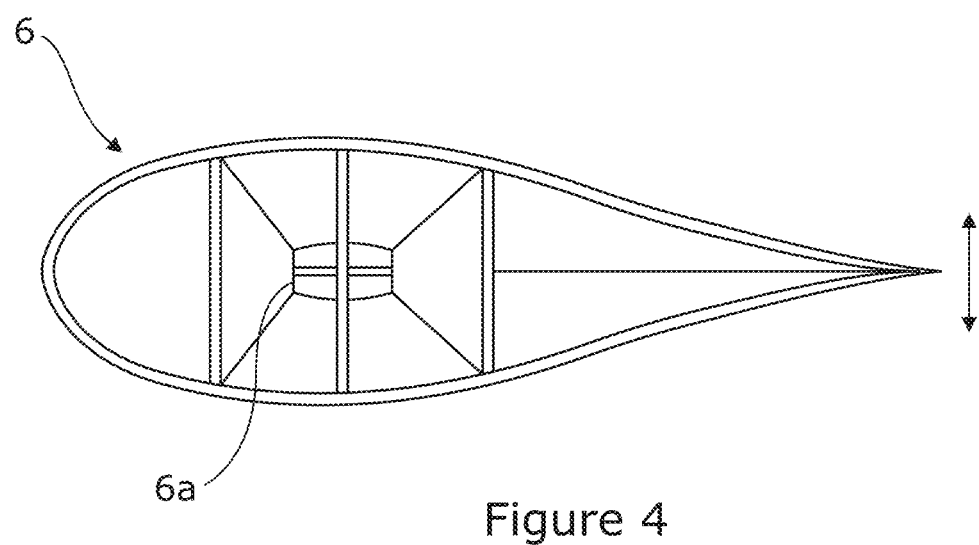

FIG. 1 schematically illustrates a wind turbine 1. The wind turbine may be either an on-shore wind turbine or an off-shore wind turbine. The wind turbine 1 comprises a tower 2 and a nacelle 3 mounted to the top of the tower 2. The nacelle 3 is provided with a rotor 4 mounted to an end face thereof, the rotor 4 comprising a central hub 5 and a plurality of blades 6 that extend outwardly from the hub 5. Each blade 6 comprises front and rear skins and a plurality of longitudinal spars or shear webs, as schematically illustrated in FIGS. 3 and 4. Each blade 6 includes a root portion or inboard portion via which it is attached to the hub 5, and a tip at its distal end furthest from the hub 5. The rotor 4 is connected via a drivetrain to an electrical generator housed within the nacelle 3.

Figure 2:
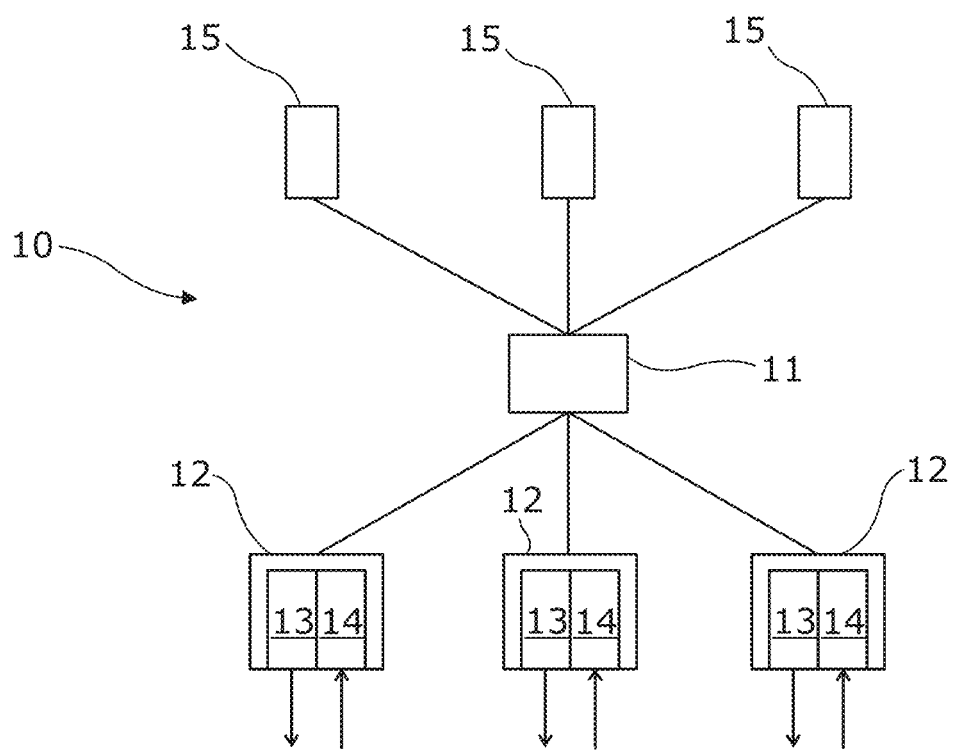
FIG. 2 schematically illustrates the control system of the wind turbine illustrated in FIG. 1.

The wind turbine 1 is provided with a control system 10 according to an embodiment of the present invention that is configured to monitor each of the blades 6 and to control operation of the blades 6, as schematically illustrated in FIG. 2. The control system 10 comprises a control module 11 that is located at the base of the tower 2 of the wind turbine 1. The control system 10 further comprises a plurality of LIDAR scanning devices 12 that are in electronic communication with the control module 11 and configured to be controlled by the control module 11. The LIDAR devices 12 are each located within and mounted to the root portion of a respective one of the blades 6 and face outwardly towards the tips of the blades 6, as schematically illustrated in FIG. 3. A simplified version of the view along the interior of one of the blades 6 as seen from one of the LIDAR devices 12 is illustrated in FIG. 4. The LIDAR devices 12 may be, for example, single chip, solid state, micro-LIDAR devices, although other types of 3-dimension scanning devices may equally be employed in other embodiments of the present invention. Examples of suitable LIDAR devices include the "M8" and "S3" systems from Quanergy Systems, Inc.

Each of the LIDAR devices 12 includes a light emitting device 13 and a light receiving device or camera 14, which may be located together within a common housing, or alternatively in separate housings and optionally at separate locations. The light emitting devices 13 are configured to emit pulses of visible laser light into the interior of the blades 6 in a direction towards the tip, as schematically illustrated in FIG. 3. The light receiving devices 14 are configured to receive light from the light emitting devices 13 as reflected back towards the light receiving devices 14 within the blades 6.

Each of the LIDAR devices 12 is configured to generate 3-dimensional images in the form of point cloud measurements of the visible portion of the interior surface of its respective blade 6 (as illustrated in FIG. 4) in dependence on the light reflected back towards the LIDAR device 12 and received at the light receiving device 14 during use of the wind turbine 1. As with a conventional LIDAR system, the 3-dimensional point cloud measurements are generated based on the time taken for reflected light to be received at the light receiving devices 14, and each comprise a large number of points each having a defined 3-dimensional location. The 3-dimensional point cloud measurements include portions of the front and rear skins of the blade 6 and portions of the longitudinal spars. The LIDAR devices 12 are configured to repeatedly generate 3-dimensional point cloud measurements, for example with a refresh rate of around 10 to 100 Hz or 50 to 100 Hz, although lower or higher frame rates would also be acceptable. The LIDAR devices 12 are further configured to communicate the 3-dimensional point cloud measurements to the control module 11 such that the control module 11 is continuously provided with 3-dimensional point cloud measurements representing the current shape of the interiors of each of the blades 6 substantially in real time during use of the wind turbine 1.

The control module 11 is configured to analyse the received point cloud measurements of the blade interiors and to control operation of the blades 6 in dependence on information derived from the point cloud measurements. Monitoring and control of a single one of the blades 6 during use of the wind turbine 1 will now be described, although it will be appreciated that the control module 11 is configured to monitor and control each of the blades 6 in an equivalent manner.

Figure 5:
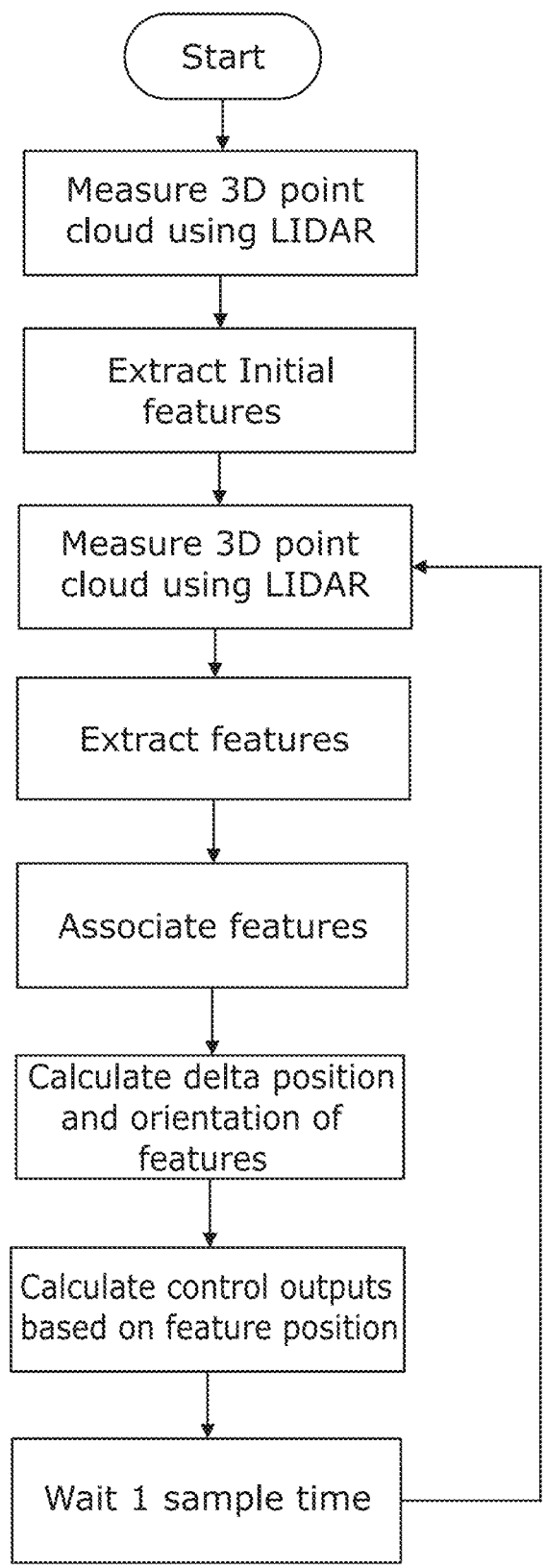
FIG. 5 illustrates a flow chart describing the steps used by the control system in controlling operation of the blades of the wind turbine.

In an initial stage, the control module 11 obtains a reference point cloud measurement of the interior of the blade 6 (as illustrated in FIG. 4) from the LIDAR device 12 located within the blade 6. This step is preferably preformed while the blade 6 is in a substantially unloaded state. The control module 11 then uses a feature extraction or object detection algorithm to extract initial recognisable features from the reference measurement for example using line identification techniques, as indicated in the flow chart of FIG. 5. The recognisable features may include natural or inherent features of the blade 6 and/or markers (that is devices such as reflective patches or strips of reflective tape that are added to the blade 6 specifically for the purpose of being identified). The control module 11 is configured to automatically and independently select at least one recognisable feature from the reference measurement to be used as a target feature for monitoring the deflection state of the blade 6. In the present example the selected target feature is the distal edge 6a of the leading edge spar, as indicated in FIG. 4. However, it will be appreciated that another recognisable feature or indeed a plurality of recognisable features may be selected as target feature(s) in other cases. Since the control module 11 is configured to automatically and independently selecting the target feature(s) to be monitored it is not necessary to initially focus the LIDAR device 12 on a specific pre-determined target feature, or to manually select a target feature when installing and calibrating the control system 10.

Once the target feature 6a has been selected, the position of the target feature 6a in the reference measurement can then be used as a reference position for the target feature. It is then possible to determine information relating to the deflection state of the blade 6 in dependence on detected movement of the target feature 6a relative to the reference position, and so the blade 6 may be controlled in dependence on detected changes in the position of the target feature 6a. The control module 11 may optionally be configured to determine the distance between the LIDAR device 12 and the target feature 6a and/or the 3-dimensional position of the target feature 6a with respect to the blade 6 from the reference measurement, and to use this information in setting a control algorithm for controlling operation of the blade 6.

During use of the wind turbine 1, the blade 6 experiences deflection under load. For example, the blade 6 may undergo flap deflection in the direction indicated with an arrow in FIG. 4. As this occurs, the positions of various features of the blade 6 (including the target feature 6a) will move within the field of view of the LIDAR device 12 located in the root portion of the blade 6. As the wind turbine 1 is operated, the control module 11 receives point cloud measurements of the blade interior from the LIDAR device 12 in the manner described above. In each measurement cycle, the control module 11 applies the feature extraction or object detection algorithm to the received point cloud measurement of the blade interior in order to extract recognisable features from the point cloud measurement. The received point cloud measurement can then be compared with the reference measurement. The control module 11 is able to recognise the target feature 6a in the received point cloud measurement and associate the target feature 6a with the target feature 6a as identified in the previously-generated reference measurement. Feature association may be performed for example using the Mahalanobis distance between features. By identifying the position of the target feature 6a in the received point cloud measurement and comparing the identified position of the target feature 6a with the reference position, it is then possible to calculate an error between the identified position of the target feature 6a in the latest point cloud measurement and the reference position established from the reference measurement. Calculation of the error between the identified position of the target feature 6a and the reference position may take into account both the change in the location of the target feature and the change in orientation of the target feature (although in some cases the calculation may be based only on the change in location).

This calculated error is indicative of the deflection state of the blade, for example the extent of deflection in the flap-wise direction.

The control module 11 is further configured to control operation of the blade 6 in dependence on the identified position of the reference feature 6a. In this particular embodiment the control module 11 is configured to apply a control algorithm including the equation:

$$\theta = K_p e$$

where "θ" is the demanded pitch angle,
"$K_p$" is a constant, which may be pre-defined or alternatively set during calibration of the control system, and
"e" is the calculated error between the identified position of the target feature 6a and the reference position
in order to calculate a pitch angle θ demand for the blade 6. A control signal specifying the demanded pitch angle θ is then outputted from the control module 11 to an actuation system 15 associated with the blade 6, which operates a motor to move the blade 6 to the pitch angle specified in the received control signal. In this way the control module 11 is able to automatically control operation of the blade by varying the pitch angle in order to limit blade deflection as inferred from the detected change in position of the target feature 6a.

The monitoring cycle of obtaining a point cloud measurement, identifying the position of the target feature 6a, establishing the error between the identified position of the target feature 6a and the reference position, calculating a pitch angle demand in dependence on the error and outputting a control signal specifying the pitch angle demand is continuously repeated at a defined cycle time interval to provide continuous in use control of the blade 6. The remaining blades 6 may also be controlled individually in a similar manner. However, in other embodiments the control module 11 may instead be configured to monitor each of the blades and to control operation of the blades together taking into account the deflection state of each of the blades, for example using a Coleman or multi-blade type transformation. In other embodiments the control module 11 may instead be configured to monitor a single one of the blades 6 and to control operation of each of the blades 6 together based on detected deflection of the monitored blade, in which case it may not be necessary to include a separate LIDAR device 12 in each blade 6.

Many modifications may be made to the above examples without departing from the scope of the present invention as defined in the accompanying claims.

For example, in the above described embodiment the control system 10 configured to control the pitch angles of the blades 6. However, in other embodiments the control system may alternatively or in addition be configured to control other aspects of the operation of the wind turbine. For example, the control system may be configured to calculate a torque or power output demand or to control operation of a movable aerodynamic surface of a blade in dependence on the identified position of a target feature.

In the above described embodiment the control system 10 is configured to monitor the state of a blade 6 and control operation of the blade 6 based on the position of a single target feature 6a relative to a field of view of an imaging device 12. However, in other embodiments the control system may equally be configured to identify the positions of a plurality of target features, and to monitor and control operation of the blade based on the positions of the plurality of target features relative to the field of view of the imaging device, or based on the relative positions of the target features. For example, it may be possible to monitor blade twist in dependence on the relative positions of the distal edges of a pair of adjacent spars, and to control operation of the blade in order to limit blade twist in dependence on the relative positions of the distal edges of the spars. In addition, in the above described embodiment the control system 10 is configured to monitor the state of a blade 6 and control operation of the blade 6 based directly on the position of a target feature, in particular by determining a positional error relative to a reference position for the target feature. However, in other embodiments the control system could alternatively monitor and control operation of a blade based on a derivative of the positions of one or more target features. For example, the control system could be configured to compare the positions of one or more recognised target features in the most recently obtained image with the positions of the same target features in a previously obtained image (for example a recently obtained image from the previous monitoring cycle), to calculate the rate of change of the absolute or relative positions of the target features between the two images, and to monitor and control operation of the blade based on the rate of change of the positions the target features.

In the above-described embodiment the control system 10 is configured to control operation of the wind turbine blades 6 directly in dependence on the identified positions of target features 6a, and it is not necessary to determine any blade state parameters for use in controlling the blades 6. However, in other embodiments the control system may additionally be configured to determine one or more blade state parameters, for example blade deflection and/or blade twist, in dependence on the identified positions of the target features. For example, the control system may store a 3-dimensional computer model of a blade, and may be configured to compare the identified position(s) of target feature(s) of the blade from a point cloud measurement with the positions of equivalent points on the blade model, to control the blade model to reduce the error between the identified positions(s) of target feature(s) of the blade and the positions of equivalent points on the blade model in order to make the blade model match the current deflection state of the blade. In this case the control system may be configured to derive blade state parameters from the blade model as modified to match the current deflection state of the blade. Alternatively the control system may be configured to determine blade state parameters using one or more look-up tables. For example it may be possible to determine blade deflection and blade twist from blade deflection and blade twist look-up tables based on an identified location and orientation of a target feature in combination with the distance between the imaging system and the target feature or the position of the target feature along the length of the blade. Where the control system is configured to determine blade state parameters in dependence on the identified positions of target features, the system may be configured to control operation of the blades based on the determined blade state parameters (as opposed to controlling operation of the blades based directly on the identified positions of the target features in the manner described above). In other embodiments the control system may further be configured to identify a behavioural condition of a blade in dependence on an identified position of a recognised target feature, and to output a warning notification and/or control operation of one or more blades in dependence on identification of the behavioural condition. For example, the control module could be configured to identify a condition of excessive vibration based on a calculated speed or acceleration of a target feature exceeding a threshold, and to control operation of the blade in order to limit vibration.

In the above-described embodiment the control system 10 is configured to obtain a 3-dimensional point cloud measurement of the interior or each blade, and to identify the position of a target feature in each point cloud measurement for comparison with a reference position. However, in other embodiments the control system may equally operate using 2-dimensional images, for example images obtained using conventional cameras. In this case the control system may still be configured to identify the position of a target feature in the 2-dimensional image and to determine the error between the identified position of the target feature and a reference position from a reference image in order to control operation of the blade in an equivalent manner.

In the above-described embodiment the control system 10 includes a single LIDAR device 12 located in the root portion of each blade. However, in other embodiments the LIDAR devices 12 could equally be provided at different locations, for example in the hub 5 of the rotor 4 facing outwardly, or there may be multiple LIDAR devices per blade, which may allow monitoring of a greater portion of each blade than is possible using only a single LIDAR device for each blade. In addition, the control module 11 could equally be located in the hub 5.

Other modifications and variations will also be apparent to the skilled person.

The invention claimed is:

1. A control system for a wind turbine, wherein the control system comprises:
    a physical, tangible element configured to:
        obtain a 3-dimensional image of at least a portion of a first blade of the wind turbine;
        recognize a plurality of target features of the first blade in the obtained image, wherein the plurality of target features includes a natural feature of the first blade and a marker attached to the first blade;
        identify a plurality of positions of the plurality of target features; and
        in dependence on the plurality of positions:
            monitor the state of the first blade; and
            control operation of at least one blade.

2. The control system of claim 1, wherein the image is an image of at least a portion of the interior of the first blade.

3. The control system of claim 1, wherein the physical, tangible element is configured to control operation of the at least one blade in order to limit one or more of a blade twist, a blade deflection, a vibration, a torque, and a power output.

4. The control system of claim 1, wherein monitoring the state of the first blade comprising determining at least one blade state parameter for the first blade in dependence on the plurality of positions.

5. The control system of claim 1, wherein the physical, tangible element is further configured to:
    identify a behavioral condition of the first blade in dependence on the plurality of positions.

6. The control system of claim 1, wherein one or both of monitoring the state of the first blade and controlling operation of the at least one blade is dependent on one or both of a location and an orientation of the plurality of target features.

7. The control system of claim 1, wherein one or both of monitoring the state of the first blade and controlling operation of the at least one blade is dependent on a first position of the plurality of positions relative to a second position of the plurality of positions.

8. The control system of claim 1, wherein the physical, tangible element is further configured to:
    determine an error between an identified position of the plurality of positions and a reference position for a target feature of the plurality of target features, and
    wherein one or both of monitoring the state of the first blade and controlling operation of the at least one blade is dependent on the error between the identified position and the reference position.

9. The control system of claim 8, wherein the physical, tangible element is configured to control operation of the at least one blade in proportion to the error between the identified position and the reference position.

10. The control system of claim 8, wherein the reference position is based on a position in a previously obtained reference image.

11. The control system of claim 1, wherein the physical, tangible element is further configured to:
    determine a rate of change of position or an acceleration of a first target feature of the plurality of target features, and
    wherein one or both of monitoring the state of the first blade and controlling operation of the at least one blade is dependent on the determined rate of change of position or the acceleration of the first target feature.

12. The control system of claim 1, wherein the physical, tangible element is further configured to:
    automatically select a first target feature of the plurality of target features from a plurality of recognizable features.

13. The control system of claim 1, further comprising a 3-dimensional scanning device configured to generate the image.

14. The control system of claim 13, wherein the 3-dimensional scanning device comprises a LIDAR scanning device.

15. The control system of claim 13, wherein the 3-dimensional scanning device is mounted to the first blade.

16. The control system of claim 13, wherein the 3-dimensional scanning device is located inside the first blade.

17. The control system of claim 16, wherein the 3-dimensional scanning device is located within a root portion of the first blade and faces towards a tip of the first blade.

18. A wind turbine, comprising
    a tower;
    a nacelle disposed on the tower;
    a rotor having one end disposed in the nacelle and having a hub disposed on another end;
    a plurality of wind turbine blades connected to the hub; and
    a control system disposed on the wind turbine, the control system comprising:
    one or more light detecting devices disposed on one or more of the wind turbine blades; and
    a controller communicatively coupled to the one or more light detecting devices; wherein the controller is configured to perform an operation comprising:
        obtaining a 3-dimensional image of at least a portion of a first blade of the plurality of wind turbine blades;
        recognizing a target feature of a plurality of target features of the first blade in the obtained image, wherein the plurality of target features includes a natural feature of the wind turbine blade and a marker attached to the wind turbine blade;
    identifying a position of the target feature; and
    in dependence on the position:
        monitoring the state of the first blade; and
        controlling operation of at least one blade.

19. A method of for use with a wind turbine, the method comprising:
- obtaining a 3-dimensional image of at least a portion of a first blade of the wind turbine;
- recognizing a first target feature of a plurality of target features of the first blade in the obtained image, wherein the plurality of target features includes a natural feature of the first blade and a marker attached to the first blade;
- indentifying a position of the first target feature; and
- monitoring the state of the first blade; and
    - controlling operation of at least one blade of the wind turbine.

20. The method of claim 19, wherein controlling operation of the at least one blade comprises:
- automatically controlling operation of the at least one blade in response to the state in order to limit one or more of a blade twist, a blade deflection, a vibration, a torque, and a power output.

* * * * *